Sept. 20, 1971    F. J. ZUIDERWEG ET AL    3,605,388
APPARATUS FOR CONTACTING LIQUIDS AND GASES
Filed July 19, 1968

INVENTORS:
FREDERIK J. ZUIDERWEG
HENDRIK J. SCHEFFER
BY: *Louis J. Bovasso*

THEIR ATTORNEY

United States Patent Office 3,605,388
Patented Sept. 20, 1971

3,605,388
APPARATUS FOR CONTACTING LIQUIDS
AND GASES
Frederik J. Zuiderweg and Hendrik J. Scheffer, Amsterdam, Netherlands, assignors to Shell Oil Company, New York, N.Y.
Filed July 19, 1968, Ser. No. 746,065
Claims priority, application Great Britain, Dec. 29, 1967, 59,245/67
Int. Cl. B01d 47/10
U.S. Cl. 55—236      1 Claim

ABSTRACT OF THE DISCLOSURE

Apparatus for contacting liquids and gases comprising a hollow chamber having a vapor inlet and outlet and a liquid inlet communicating with the interior of the chamber. Rotational means is mounted in the chamber downstream of the vapor inlet for imparting rotary movement to a mixture of liquid and vapor within the apparatus. Constriction means is disposed downstream of the rotational means and upstream of the vapor inlet for constricting the flow through said chamber.

BACKGROUND OF THE INVENTION

Field of the invention

The invention relates to an apparatus for contacting liquids and gases; and more particularly, apparatus for passing a mixture of liquid and gases in cocurrent flow while imparting rotational movement to the mixture.

Description of the prior art

Prior art apparatuses for contacting liquids and gases consist of a chamber open on either end and provided on one end with means for the separate supply of liquid and gas and on the other end with means for the separate discharge of liquid and gas, where it is possible for the liquid and the gas to be passed through that chamber in cocurrent flow, and where within that chamber during the process of exchange the gas is in the continuous phase and the liquid is in the dispersed phase, and where within that chamber one or more components are present which are capable of imparting a rotational movement to the mixture of liquid droplets and gas.

The term gas is taken throughout this specification also to include vapor.

These apparatuses may be used, for instance, for the exchange of matter and/or heat between a liquid and a gas as employed, for example, for the separation of hydrocarbon mixtures by distillation or for the absorption of a gas from a mixture of gases with the aid of a liquid.

The contact between liquid and gas in apparatuses of this type is effected mainly by complete or nearly complete atomization of the liquid. For the purpose of promoting this atomization, special means may be present, such as, for instance, strips placed on the wall, which strips constitute an obstacle for the liquid flowing over the wall. After the exchange section, a rotational movement is imparted to the mixture of liquid droplets and gas, for instance by means of a vane deck. The liquid then collects on the wall and is discharged separately from the gas.

In order to obtain a large capacity, a plurality of contacting apparatuses may be placed on one tray within an enclosing wall, liquid and gas being evenly distributed among those apparatuses. The separating efficiency may be increased by installing a plurality of trays of this type in a column; the apparatuses on each tray are then placed as far as possible in a coaxial position relative to the apparatuses on the adjacent trays in order that the rotation of the gas is prompted as far as possible.

Contacting apparatuses of this type are advantageous in that they may be very heavily loaded. For commercial applications, however, in many cases a high flexibility also is desired. By flexibility is understood in this connection the ratio between the maximum permissible gas load and the minimum gas load at which it is still possible to reach, with the apparatus for the separation in question, a high enough degree of contact between liquid and gas.

A high flexibility implies that separation can be effected both at a small and at a large supply of the mixture to be separated. This may be of importance, for instance, when the mixture becomes available in continually varying quantities or when, owing to an increase in the demand, a larger quantity of the mixture has to be separated.

When the liquid/gas ratio is increased, the gas capacity of the contacting apparatuses mentioned hereinbefore strongly decreases, but the lowest gas load at which the apparatus is effective is influenced only in a small measure. This results in the flexibility being decreased, the possibility of varying the load thus being limited.

SUMMARY OF THE INVENTION

It is an object of this invention to provide means for increasing the flexibility of gas-liquid contacting apparatuses.

According to the invention, the tubular chamber of a gas-liquid contacting apparatus is provided on its vapor inlet side with a constriction in a manner whereby the diameter of the chamber changes gradually with increasing distance from the constriction in the upstream and in the downstream direction, and whereby the outlet of the device—or the devices—for the supply of liquid is located in a zone whose length measured from the location where the constriction is largest towards the downstream direction, is equal to half of the largest diameter of the tubular chamber.

This constriction results in an increase in the rate of flow of the gas on the side of the vapor inlet of the tubular chamber. Thus, the entrainment by the gas of the liquid introduced at that location is prompted. Furthermore, the disperant effect of the gas stream on the liquid becomes stronger. This leads to considerably lower values on the minimum load at which liquid and gas will flow through the apparatus cocurrently and thereby will come into intimate contact with each other, which intimate contact is an essential condition for the process of exchange.

The amount of liquid that can be supplied to the apparatus is to an important extent dependent on the back pressure to which the liquid is subjected at the location of the liquid inlet. The constriction effects an increase in the drop in the pressure of the gas flowing through the apparatus and, hence, the pressure on the side of the liquid inlet rises having an adverse influence on the capacity. By providing for the diameter of the apparatus before and after the constriction to change gradually, the increase in the pressure drop effected by the constriction is kept very small. The loss in capacity is then very small.

This purpose is likewise reached when the liquid inlet is situated downstream from the location where the constiction is largest, because droplets of liquid which move in the upstream direction under the influence of gravity in the zone where the constriction is largest are subjected to the effect of the accelerated gas flow. This situation of the liquid inlet may be useful when that liquid inlet projects inwardly, for instance in order to prevent liquid from flowing down along the wall of the apparatus. For, in that case the liquid may project inwardly without causing a further decrease in the free cross-sectional area of the apparatus.

An additional advantage may be obtained when liquid discharged from the apparatus or intended for supply to the apparatus flows through the space immediately surrounding the apparatus at the location of the liquid inlet. Thus, for instance in the case of apparatuses which are surrounded by a second wall and where the liquid from the apparatus is discharged via the annular channel between the walls, the larger cross-sectional area of that annular channel will enable the cross section of the conduits for the supply of liquid to the apparatus to be increased.

Good results are obtained when the decrease in the diameter of the apparatus at the location where the constriction is largest amounts to approximately 10–30% less than the largest diameter of the chamber. Then a considerable increase in the flexibility can be achieved at a small attendant decrease in the capacity.

It is favorable for the apparatus to be shaped like a venturi tube, in such a way that, particularly in the downstream direction, the diameter changes gradually with increasing distance from the constriction. For instance, the increase in the diameter in the downstream direction may extend over a distance covering the entire exchange section of the apparatus. The increase in the pressure drop caused by the constriction will then be so small that the consequent decrease in the capacity may be neglected for practical applications.

DESCRIPTION OF THE PREFERRED EMBODIMENTS

Figure 1:
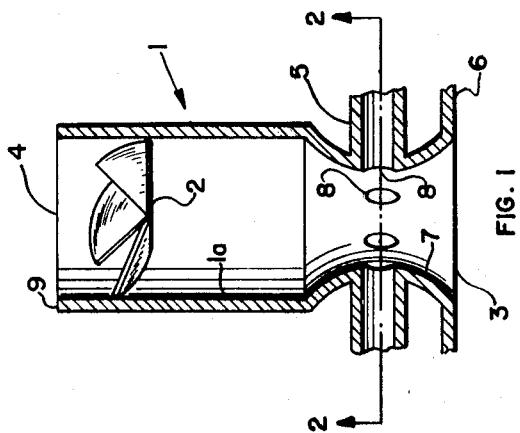
FIG. 1 is a vertical sectional view of one embodiment of a liquid-vapor contacting apparatus for carrying out the concepts of the invention.
Figure 2:
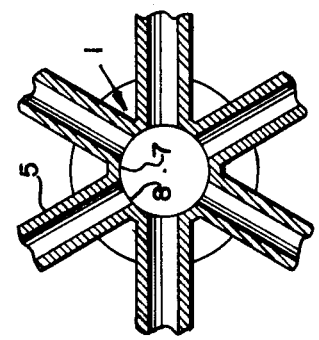
FIG. 2 is a sectional view taken along line 2—2 of FIG. 1.

Referring first to FIGS. 1 and 2, there is illustrated a liquid-vapor contacting chamber 1 through which a gas or vapor stream may be passed. A vane deck 2, comprised of arcuately-spaced overlapping vanes, extends radially of substantially the center line of the chamber 1 and is positioned within the chamber in order to impart rotational movement to the liquid-vapor mixture flowing therein. The chamber 1 of FIGS. 1 and 2 has a tubular contacting wall 1a. Vapor enters the chamber 1 through vapor inlet aperture 3 and exits through the vapor outlet aperture 4 opposite to aperture 3 in wall 1a. Liquid is supplied to chamber 1 through a plurality of conduits or ducts 5 which extend through or are otherwise integral with the tubular contacting wall 1a of chamber 1. The chamber 1 is disposed on a tray 6 which may form one or more of the trays disposed in a gas column (not shown) as disclosed in U.S. Pats. 3,296,774; 3,345,046; 3,304,694 and the copending applications to Trouw, Ser. No. 646,875, filed June 19, 1967 now Pat. No. 3,498,028, and Zuiderweg et al., Ser. No. 465,657, filed June 21, 1965 now Pat. No. 3,399,870.

On the vapor inlet side of chamber 1, there is provided a constriction 7. The ducts 5 terminate at the point where the constriction is greatest as can be seen in FIG. 1. The constriction 7 in the embodiments of FIGS. 1 and 2, at the beginning of inlet aperture 3, is substantially the same diameter as outlet aperture 4. Constriction 7 then tapers inwardly from the beginning of inlet aperture 3 to its greatest point of intersection with the outlet portions 8 of ducts 5. Finally, constriction 7 tapers outwardly from outlet portions 8 towards the aperture 4 of chamber 1 so that the constriction 7 blends into wall 1a as can best be seen in FIG. 1. In other words, the diameter of chamber 1 changes gradually with increasing distance from the constriction 7 in the upstream and downstream directions.

In operation, gas and liquid, introduced into chamber 1 through aperture 3 and ducts 5, respectively, pass through in co-current flow with the vane deck 2 imparting rotational movement to the mixture of liquid droplets and gas. The liquid droplets are flung centrifugally against the inner wall 1a of chamber 1 and the liquid layer thus formed flows off through apertures or slits (not shown) in wall 1a or over the rim 9 of wall 1a at the vapor outlet aperture 4 of chamber 1 in the manner described in detail in the aforementioned patents and copending applications.

The diameter of the widest portion of constriction 7, i.e., in the embodiment of FIG. 1, at its intersection with outlet portions 8, is preferably approximately equal to 10 to 30% less than the largest diameter of tubular chamber 1. As discussed hereinabove, this constriction 7 results in an increase in the rate of flow of the gas on the side of the inlet aperture 3 of tubular chamber 1 and promotes entrainment by the gas of the liquid introduced at that location. Since the liquid inlet aperture 3 is upstream from the largest portion of the constriction 7 (i.e., where the diameter of chamber 1 is narrowest), droplets of liquid moving in the upstream direction under the influence of gravity are subjected to the effect of the accelerated gas flow in the zone of the point of greatest constriction.

Figure 3:
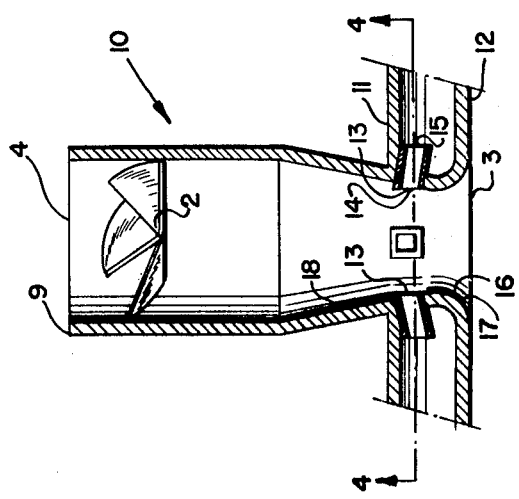
FIGS. 3 and 4 are vertical sectional views of alternate embodiments of the invention.
Figure 4:
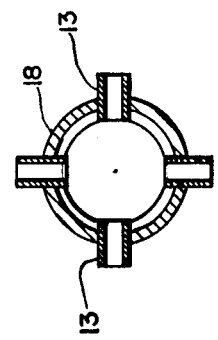

In the embodiments of FIGS. 3 and 4, like numerals refer to like parts of FIGS. 1 and 2. In FIG. 3, the contacting chamber 10 is disposed on a tray 11. A liquid supply trough 12 is disposed under chamber 10 for containing liquid therein; liquid inlet conduits or ducts 13 preferably extend towards the center line of chamber 10 and are angled upwardly so that the underside of the outlet portion 14 of ducts 13 is at substantially the same horizontal level as the upper side of the inlet portion 15 as can be seen in FIG. 3. Ducts 13 thus communicate with both the interior of chamber 10 and the liquid disposed in trough 12. Ducts 13 may extend a short distance into the interior of chamber 10, if desired.

At the inlet side of chamber 10, a constriction 16 is shown. On the upstream side of chamber 10, that is, extending from the widest portion of inlet aperture 3, is a curved section 17 of wall 1a. On the downstream side of chamber 10, i.e., extending from the narrowest portion of inlet aperture 3, is a conical or tapered section of chamber 10. In other words, the constriction 16 begins at inlet portion 3, curves inwardly a short distance towards the center line of chamber 10, then outwardly until it blends into inner wall 1a as seen in FIG. 3.

The outlet portions 14 of ducts 13 are situated downstream of the point of greatest constriction; the outlet portions 14 preferably open in a zone whose length, measured from the point where constriction 16 is greatest towards the downstream direction, is equal to substantially one-half of the largest diameter of chamber 10 as can best be seen in FIG. 3.

Figure 5:
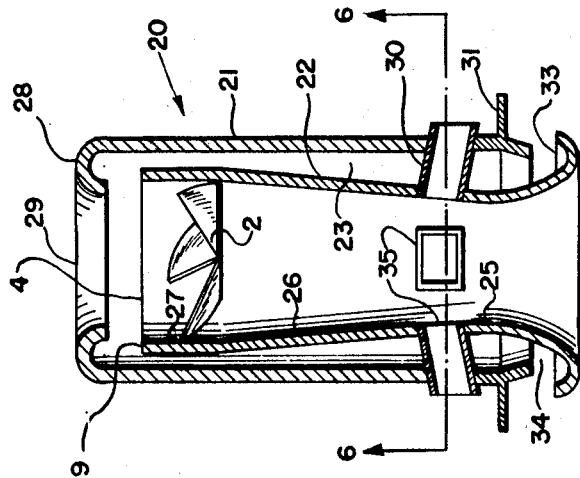
FIGS. 5 and 6 are sectional views taken along lines 3—3 and 4—4, respectively, of FIGS. 3 and 4.
Figure 6:
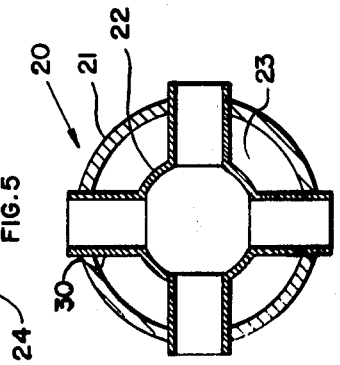

The operation of the chamber of FIG. 3 is essentially the same as that of FIG. 1. Liquid from trough 12 is introduced through ducts 13 into chamber 10. The liquid inlet ducts 13 are situated downstream from the location where constriction 16 is greatest as discussed hereinabove Referring now to the embodiment of FIGS. 5 and 6, wherein like numerals again refer to like parts of the embodiments of FIGS. 1 through 4, contacting chamber 20 comprises a tubular outer wall 21 and a tubular inner wall 22 forming an annular space 23 therebetween. Inner wall 22 is similar to wall 1a of the embodiment of FIG. 1 excepting that the vapor inlet 24 has a flared portion curving inwardly towards a constriction 25 similar to the constrictions of FIGS. 1 and 3, 25 then tapers outwardly until inner wall 26 blends into upper wall 27 as seen in FIG. 5. In other words, the wall 26 between constriction 25 and vane deck 2 has a generally conical configuration.

Outer wall 21 surrounds inner wall 22 and extends vertically above wall 26 and is curved at 28 inwardly and downwardly towards the center line of wall 22 and beyond annular space 23 for reasons to be discussed further hereinbelow. A vapor exit aperture 29 is formed by outer wall 21 and communicates with the vapor outlet 4 of inner wall 22.

A plurality of liquid inlet ducts 30 extend towards the center line of inner wall 22 and are angled upwardly in the manner of ducts 13 of FIG. 3. The annular space 23 communicates with the liquid supply tray 31. A liquid seal 33 is formed at the inlet 24 as is well known in the art. The ducts 30 receive inlet from tray 31 in the manner discussed hereinabove. Again, the operation of the contacting chamber 20 is similar to the embodiments of FIGS. 1 and 3; the vapor enters inlet 24 and is discharged through vapor outlet 29. The liquid introduced through ducts 30, is flung outwardly by vane deck 2 against the inner wall 22. The liquid thus flung passes over rim 9 of inner wall 22 and is collected in the annular space 23. The collected liquid is preferably discharged through the aperture 34 at the bottom of annular spaced 23 and into the tray 31 by means (not shown) well known in the art.

The upward angling of ducts 30, as discussed hereinabove, prevents the outflow of vapor through the liquid supply ducts 30, thus eliminating the necessity for a separate liquid seal at the outlet portions 35 of ducts 30. Outlet portions 35 preferably open at the point where constriction 25 greatest as discussed hereinabove with respect to ducts outlets 8 and 13 of FIGS. 1 and 3. Since at the outlets 35, the width of annular chamber 23 is greatest as seen in FIG. 5, the dimensions of the ducts 30 may be large and occupy a large portion of the circumference of the chamber 20 with the liquid meeting little resistance and being evenly distributed over the circumference of chamber 20.

EXAMPLE

Experiments have been carried out in a chamber according to the embodiment of FIG. 3. The length of the chamber was 400 mm., the diameter of the inner wall at the location of the vane deck was 110 mm., and the diameter of the inner wall at the location where the constriction was largest was 90 mm. at a volume ratio between liquid and gas of 0.01, the increase in flexibility relative to an apparatus without any constriction amounted to 90%. The loss in capacity of the chamber was only 4%.

It is to be understood that the chambers of this invention may take a variety of configurations, such as those disclosed in the aforementioned patents and copending applications, although preferred embodiments of the invention have been discussed, minor variations and alterations may occur to one skilled in the art and it is to be understood that such modifications fall within the spirit and scope of the appended claim.

We claim as our invention:

1. Apparatus for contacting liquids and gases comprising:
   a generally tubular hollow-wall structure forming a chamber and having a vapor inlet end and a vapor outlet end in communication with one another through said chamber;
   liquid inlet means disposed in said wall structure and communicating with the interior of said chamber;
   mixture rotational means mounted in said chamber and disposed downstream of both the vapor inlet end and the liquid inlet means and adapted to impart a rotational movement to a mixture of liquid and vapor flowing within the apparatus;
   constriction means disposed upstream of said mixture rotational means and downstream of said vapor inlet end adapted to change the inside diameter of said wall structure gradually with increasing distance beginning from substantialy the vapor inlet end and inwardly towards the center line of said chamber, then outwardly from the point of greatest constriction towards the wall structure, the point of greatest constriction being approximately 10 to 30% less than the largest diameter of the apparatus;
   said liquid inlet means comprising a plurality of liquid supply ducts communicating with the interior of said chamber at the point of greatest constriction;
   each of said ducts being angled upwardly and having an inlet portion in communication with an outlet portion, the underside of the outlet portion of each of said ducts being substantially at the same horizontal level as the upper side of the inlet portion of each of said ducts, said outlet portions communicating with the interior of said chamber in a zone whose length, from the point of greatest constriction towards the downstream direction, is equal to approximately one-half of the largest diameter of said chamber;
   said wall structure incuding an upper tubular portion downstream of said rotational means and a lower portion upstream of said mixture rotational means tapering first inwardly and downwardly towards the point of greatest constriction of said constriction means, then tapering downwardly and outwardly from the center line of said chamber thus forming a generally frusto-conical shape between said point of greatest constriction and said rotational means;
   an outer tubular wall structure surrounding the first-mentioned wall structure thereby forming an annular space therebetween;
   the upper end of said outer tubular structure extending vertically above the first-mentioned wall and curved inwardly and downwardly towards the center line of said chamber beyond the annular space formed between the first and outer tubular wall structures;
   liquid supply means cooperating with the annular space for passing liquid from said annular space through said liquid inlet means; and
   said outlet portions of said liquid inlet means occupying a substantially large portion of the circumference of said first-mentioned wall structure at said point of greatest constriction.

References Cited

UNITED STATES PATENTS

| | | | |
|---|---|---|---|
| 1,741,519 | 12/1929 | Huff | 261—114(.1) |
| 2,523,126 | 9/1950 | Long | 261—114X |
| 3,345,046 | 10/1967 | Versluys et al. | 55—238X |
| 3,498,028 | 3/1970 | Trouw | 261—116X |

DENNIS E. TALBERT, JR., Primary Examiner

U.S. Cl. X.R.

55—237, 257, 396, 450, 456; 261—79, 114, 126